US009927991B2

(12) United States Patent
Jain et al.

(10) Patent No.: US 9,927,991 B2
(45) Date of Patent: Mar. 27, 2018

(54) EXTENT MOVEMENT SPEED IN MULTI-TIERED SYSTEMS

(71) Applicant: International Business Machines Corporation, Armonk, NY (US)

(72) Inventors: Abhishek Jain, Baraut (IN); Kushal S. Patel, Pune (IN); Sarvesh S. Patel, Pune (IN); Subhojit Roy, Pune (IN)

(73) Assignee: International Business Machines Corporation, Armonk, NY (US)

( * ) Notice: Subject to any disclaimer, the term of this patent is extended or adjusted under 35 U.S.C. 154(b) by 119 days.

(21) Appl. No.: 15/157,914

(22) Filed: May 18, 2016

(65) Prior Publication Data

US 2017/0336994 A1  Nov. 23, 2017

(51) Int. Cl.
*G06F 3/06* (2006.01)
*G06F 12/08* (2016.01)
*G06F 12/1009* (2016.01)
*G06F 12/0811* (2016.01)
*G06F 12/109* (2016.01)

(52) U.S. Cl.
CPC ............ *G06F 3/0619* (2013.01); *G06F 3/065* (2013.01); *G06F 3/0613* (2013.01); *G06F 3/0685* (2013.01); *G06F 12/0811* (2013.01); *G06F 12/109* (2013.01); *G06F 12/1009* (2013.01); *G06F 2212/283* (2013.01); *G06F 2212/657* (2013.01); *G06F 2212/7201* (2013.01)

(58) Field of Classification Search
CPC .... G06F 3/0613; G06F 3/0655; G06F 3/0685; G06F 12/0811; G06F 12/1009; G06F 2212/283
See application file for complete search history.

(56) References Cited

U.S. PATENT DOCUMENTS 7,949,637 B1   5/2011  Burke
8,612,682 B2  12/2013  Jaquette

*Primary Examiner* — Hal Schnee
(74) *Attorney, Agent, or Firm* — Steven F. McDaniel; David B. Woycechowsky

(57) ABSTRACT

Mechanism designed to minimize copying of data from one memory tier to another. Data in a first memory location, is addressed based on its logical block address (LBA). When the data is copied into a second cache memory location, the LBA is updated to address the data at the second location. The first memory location is preserved intact. If the data is to be copied back to the first memory location, and the data has not changed since being copied into the second location, the LBA is updated to address the data at the first memory location, and no physical copying of the data from the second location to the first is performed.

15 Claims, 7 Drawing Sheets

EXTENT MOVEMENT SPEED IN MULTI-TIERED SYSTEMS

BACKGROUND

The present invention relates generally to the field of computer file system management, and more particularly to minimizing data copy operations within the file system.

Modern storage controllers provide a mechanism of multi-tiered storage where data is stored on various types of storage devices primarily based on criteria of the access, frequency of use, security and data recovery requirements. For example, data that is frequently accessed by an application that is sensitive to response time might be stored on a solid state drive (SSD). Other data that is infrequently accessed and for which a longer response time is more tolerable might be stored on a conventional disk drive. The cost of storage is typically higher for SSDs than it is for disk drives of comparable storage capacity.

In a multi-tiered storage system, there are at least two tiers available in which one tier provides a relatively fast response time and the other is relatively slower. Since storage with faster response times is typically more expensive than storage with slower response times, the capacity of faster storage is typically smaller than that of slower storage. Based on the data access frequency, conventional multi-tier algorithms "promote" "hot data" (data that is accessed relatively frequently) to a faster tier and "demote" "cold data" (data that is accessed relatively less frequently) to a slower tier. This promotion and demotion process of data extents (see definition in the Definitions sub-section of the Detailed Description section below) typically involves relocation of the data from one tier to another using copy operations that are performed without the knowledge of the application.

SUMMARY

According to an aspect of the present invention, there is a method, computer program product and/or system that performs the following operations (not necessarily in the following order): (i) storing, at a first physical address, an extent; (ii) mapping a logical block address (LBA) of the extent to the first physical address; (iii) copying, at a second physical address, the extent; (iv) mapping the LBA of the extent to the second physical address; (v) tracking change histories of the first physical address and the second physical address; and (vi) on condition that the change histories of the first physical address and the second physical address indicate that data stored at both physical addresses has changed at neither the first physical address nor the second physical address, re-mapping the LBA to the first physical address.

DETAILED DESCRIPTION

Figure 1:
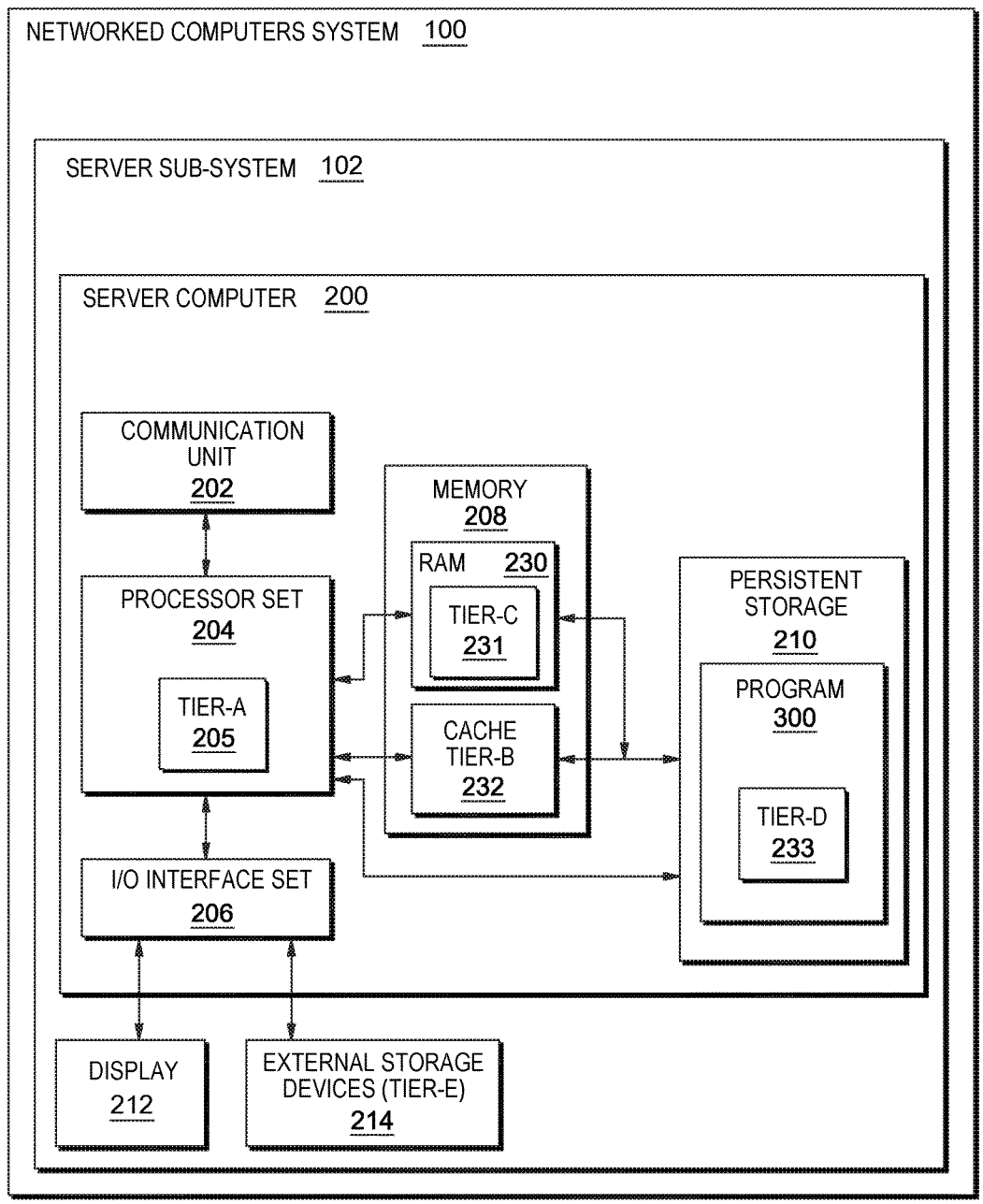
FIG. 1 is a block diagram of a first embodiment of a system according to the present invention.

Embodiments of the present invention provide a mechanism designed to minimize copying of data from one memory tier to another. For example, data may be in cache memory at a physical location on a random access (RAM) device. A logical block address (LBA) of the data is mapped to the physical location on the RAM. If frequency of usage of the data increases, the data is "promoted" into a faster cache tier, for example onto a processor on-chip cache. The LBA of the data is mapped to the physical location of the data on the processor cache. The copy of the data remaining on the RAM device is not overwritten (unless made necessary by resource demands). Any changes to the physical locations of the data, in both the RAM and the processor on-chip cache tiers is tracked. If usage of the data (the data is now mapped to the processor cache tier) decreases, the data is "demoted" back to the slower RAM cache tier. If the change tracking indicates that the data at neither the processor on-chip cache nor the RAM cache tiers has changed (meaning the data is identical in both places), the data is demoted by updating the logical block address mapping to the physical address on the RAM device, and no physical copying of the data is performed. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; server computer 200; communication unit 202; processor set 204; tier-A memory 205, input/output (I/O) interface set 206; memory device 208; persistent storage device 210; display device 212; external device set 214; random access memory (RAM) devices 230; tier-C memory 231; cache memory device (tier-B) 232; tier-D memory 233; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
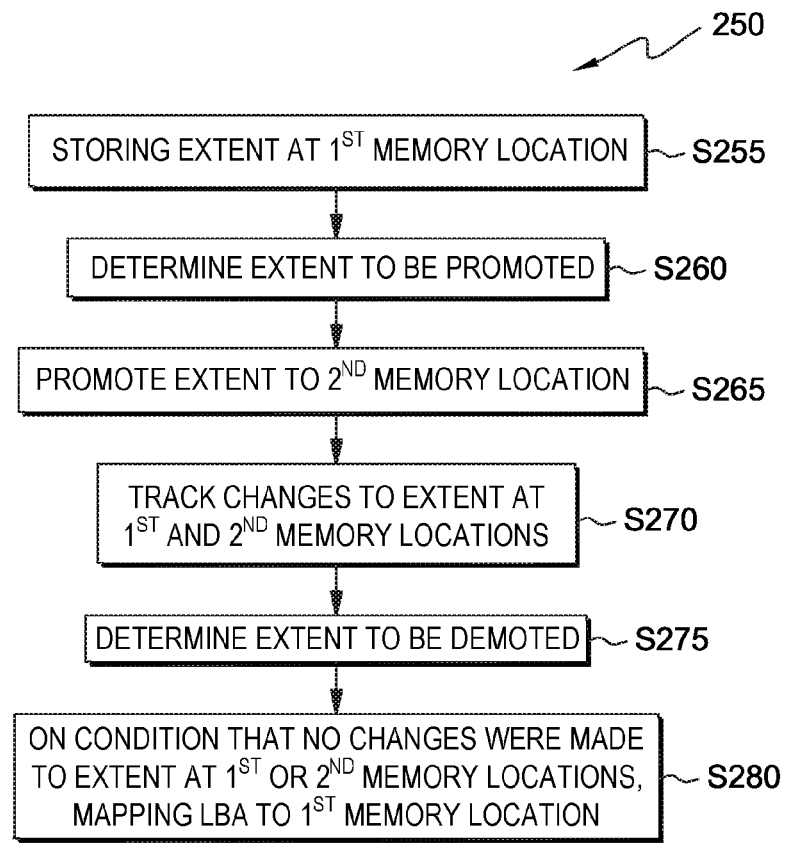
FIG. 2 is a flowchart showing a first embodiment method performed, at least in part, by the first embodiment system.
Figure 3:
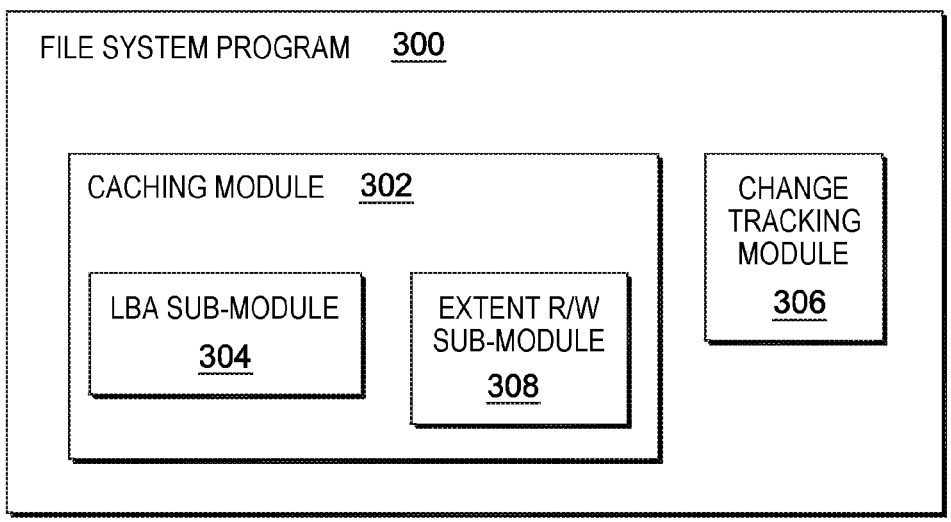
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where caching module 302, of file system program 300, stores an extent at a first memory location (at a physical address within a memory device), and mapping a first logical block address (LBA) to the first memory location. In one embodiment, the first memory location is cache (tier-C) 231 in RAM 230, of memory 208, of server computer 200, of server sub-system 102 as shown in FIG. 1. LBA sub-module 304 maps the LBA of the extent to a physical memory address in RAM 230, where the extent is physically located. (The mapping of an extent's LBA to its physical memory address, in some embodiments of the present invention, involves multiple virtual addressing layers; however, determination of the physical memory address is based at least in part, upon the logical block address).

Note: whether an extent is being copied from a slower tier to a faster one, or from a faster tier to a slower one, (being promoted or demoted) the extent is being copied from a "source" tier to a "destination" tier for purposes of description as those terms are used herein.

Processing proceeds to operation S260, where caching module, 302 of file system program 300, determines that the extent is to be promoted to a higher-level (faster) cache location.

Processing proceeds to operation S265, where extent read/write sub-module 308, of caching module 302, of file system program 300, promotes (copies) the extent into a second memory location. In this embodiment, the second memory location is cache (tier-A) 205, of processor set 204. Cache (tier-A) 205 is an on-chip cache memory component on processor set 204. LBA sub-module 304 maps the LBA of the extent to the second memory location on the processor set. The copy of the extent in the first memory location becomes dormant (no longer referenced by the LBA). It remains intact (until or unless another application or the file system overwrites some or all of the extent's memory location).

Processing proceeds to operation S270, where change tracking module 306, of file system program 300, monitors activity at the first and second memory locations where copies of the extent are stored. A change to data stored at the first and/or second memory locations is recorded by change tracking module 306. In this embodiment, the change tracking module maintains a bit mapped data structure, wherein bits respectively corresponding to each of the first and second memory locations of the extent, are initialized at zero when the extent is promoted to the second memory location. If either or both of the two memory locations are altered, the corresponding change bit(s) are set to 1.

Processing proceeds to operation S275, where caching module 302 of file system program 300 determines that the extent is to be demoted from the second memory location in the on-chip cache tier-A cache 205 of processor set 204, back to the first memory location at tier-C 231. Reasons for demoting an extent from a faster cache to a slower cache include cases where the pattern of access to the extent no longer justifies keeping it in a small, faster cache memory.

Processing proceeds to operation S280, where: (i) change tracking module 306 determines, by reference to the bit mapped data structure, that the first and second memory locations of the extent, have not changed since the extent was promoted to the second memory location, which means the data stored at the first and second memory locations are identical; and (ii) LBA sub-module 304 maps the LBA of the extent to a physical memory address in RAM 230, where the extent is physically located, thereby simultaneously reactivating the dormant copy of the extent and de-activating (making dormant) the copy of the extent remaining on the processor cache memory device.

On the other hand, if the change tracking module determines that the first and/or second memory locations have been altered since the extent was promoted to the second memory location, then the extent is demoted in a conventional manner, wherein: (i) a suitable region of memory on the first memory device is selected; (ii) the extent is physically copied into the suitable region of memory; and (iii) on successful completion of the copy operation, the LBA of the extent is updated to map to the physical memory location of the extent at its new location in memory. For data that is to be demoted from the second tier to the first tier, reasons why the first and/or second memory location might have been altered include: (i) an application may have overwritten (updated) data in the extent in the second location; and (ii) the file system needed to use the first tier memory location, where the extent was stored, for other data.

III. Further Comments and/or Embodiments

Some embodiments of the present invention recognize the following facts, potential problems and/or potential areas for improvement with respect to the process of data migration that involves movement of a dataset between available memory tiers in the current state of the art: (i) migration of the dataset may be time consuming; (ii) migration of the dataset may take many processor cycles, particularly if the dataset being relocated is large; (iii) copies the whole data extent (see definition in the Definitions sub-section in this Detailed Description section) to the slower tier upon demotion to the slower tier; (iv) consumes significant time and storage controller processor cycles; and/or (v) has a negative impact on performance of the system.

Some embodiments of the present invention may include one, or more, of the following features, characteristics and/or advantages: (i) minimizes the number of copies from one tier to another; (ii) retains, for as long as possible, a copy of a dataset at a slower tier even though the extents of the dataset have been promoted to a faster tier; (iii) uses a copy of the dataset that is retained in the slower tier, when extents of the dataset are demoted from a faster tier to the slower tier (provided that the extents in the slower tier haven't been overwritten while the dataset was on the higher tier); (iv) performs the demotion of a dataset to a slower tier nearly instantaneously, regardless of the size of the dataset; and/or (v) minimizes the cost (in terms of time and processor cycles) of data migration between tiers.

Some embodiments of the present invention may include one, or more, of the following features, characteristics and/or advantages: (i) reduces the frequency of data copies across tiers in a multi-tiered storage system; and/or (ii) retains a data block on the slower tier after the data block has been promoted to a faster tier.

When a dataset on a slower tier becomes hot (due to very frequent accesses) a storage controlling algorithm moves the dataset in the extent to the faster tier (sometimes referred to as a "higher" tier). At this stage, instead of deleting the dataset from slower tier (as is done in conventional systems), information relative to the extent is recorded in an array, or other data structure, that includes: (i) a record of the starting logical block address (LBA) of the extent; (ii) the size of the extent on the slower tier; and/or (iii) the starting LBA of the higher (faster) tier to which the dataset extent has been migrated. This data structure keeps track of all extents that are promoted. As soon as an extent has been migrated to the higher tier, a bitmap is used to track those extents that have been overwritten. When an extent is demoted from the higher tier back to the slower tier from which it was promoted, it is copied to the slower tier if it has been overwritten or changed at either tier. However if the extent has not been overwritten or changed after promotion to the faster tier and it has not been changed on the faster tier, it is not physically copied during demotion back to the slower tier. Instead, the copy that is available on the slower tier (and has not been overwritten or changed) is reused. That is, it is mapped to a virtual disk. NOTE: change tracking must be done for all promoted and demoted extents (on both lower and higher tiers). The technique disclosed herein is used where the data copy has not changed on either location. In other words, the copies on the slower and faster tiers must be identical. The technique can be used for data migration in both directions: (i) retaining data at the slower tier after promotion to the faster tier, and (ii) retaining data at the faster tier after demotion to the slower tier.

Some embodiments of the present invention may include one, or more, of the following features, characteristics and/or advantages: (i) reduces the number of copy operations while data is being migrated from higher tier to lower tier or vice-versa in a multi-tiered environment; (ii) results in better central processing unit (CPU) utilization for the storage system by reducing the number of data copy operations between tiers; (iii) reduces network bandwidth usage relative to migration operations across tiers; (iv) does not require additional memory space and can be implemented using the existing memory space already available in the storage system; (v) increases speed of copy operations because virtual to physical disk mappings are simply manipulated to point to the alternate tier where the copy of data already exists; (vi) reduces the time duration for which host input/output (I/O) channels are used in relation to data is being moved; and/or (vii) uses conventional change tracking mechanism(s) to create snapshots, etc.

Note: Slower memory tiers typically have excess space available while a higher memory tier of flash type is likely to have stored thereon, hot data that is read more frequently than written, to extend the life of flash devices.

In a multi-tiered storage system, there are at least two storage tiers available in which one of the tiers has a faster response time and smaller capacity as compared to another tier that has relatively slower response times but has relatively higher storage capacity. Based on the data access frequency, a multitier storage algorithm relocates hot data (data that is accessed frequently) from a slower tier to a faster tier. Cold data (data that is accessed infrequently) is relocated in the reverse direction (from a faster tier to a slower tier).

Data extents are placed in tiers depending upon data access frequency where frequently accessed data is identified as "hot" while less frequently accessed data is termed "cold". Hot data is moved from slower tiers to faster tiers and cold data is moved from faster to slower tiers. This data movement across tiers requires data to be copied from one tier to the other. Data migration can become expensive due to frequently performed relocation operations which consume CPU cycles & network bandwidth. Some embodiments of the present invention may include one, or more, of the following features, characteristics and/or advantages: (i) retains a copy of data untouched on a source tier for as long as possible by keeping source and destination information in a tracking table; (ii) performs change tracking extents on both tiers (a source tier and the corresponding destination tier); (iii) physically copies data from a source tier to a destination tier, if the data has been changed at either tier; (iv) updates virtual addresses to point to the data on the destination tier, if the data is unchanged on both tiers (that is, if the data being migrated is identical on both tiers); and/or (v) at the slower tier, extents that have been promoted are reused (overwritten) if there is no more space available on the slower tier for new data coming into the slower tier.

Figure 4:
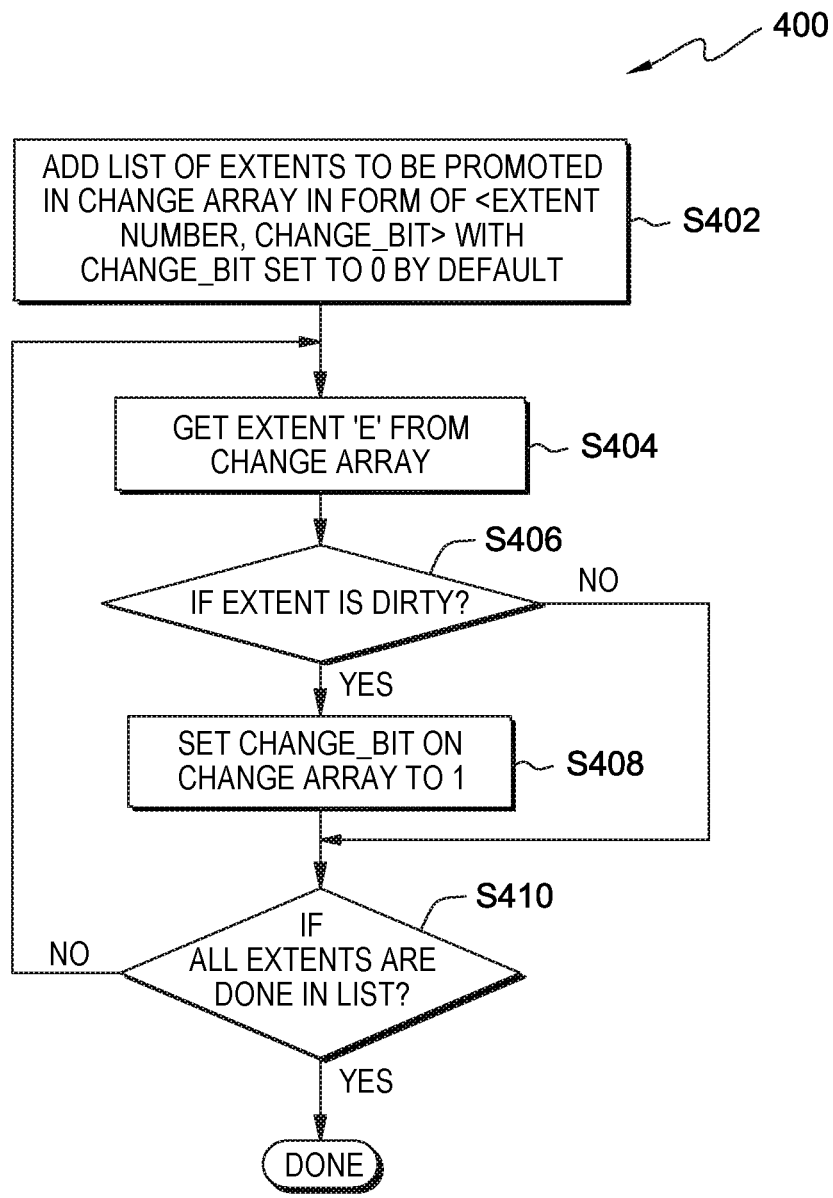
FIG. 4 is a flowchart of a second embodiment of a method according to the present invention.

Flowchart 400 of FIG. 4 includes the following operations (with process flow among and between the operations as shown by arrows in FIG. 4): S402, S404, S406, S408, and S410.

In some embodiments of the present invention, a new WRITE operation is performed on a promoted extent as follows: (i) a WRITE operation is requested on an extent, for example extent-E; and (ii) if the WRITE operation is completed successfully, set extent-E as "dirty" (operation S406) and set corresponding CHANGE_BIT to 1 (operation S408).

Figure 5:
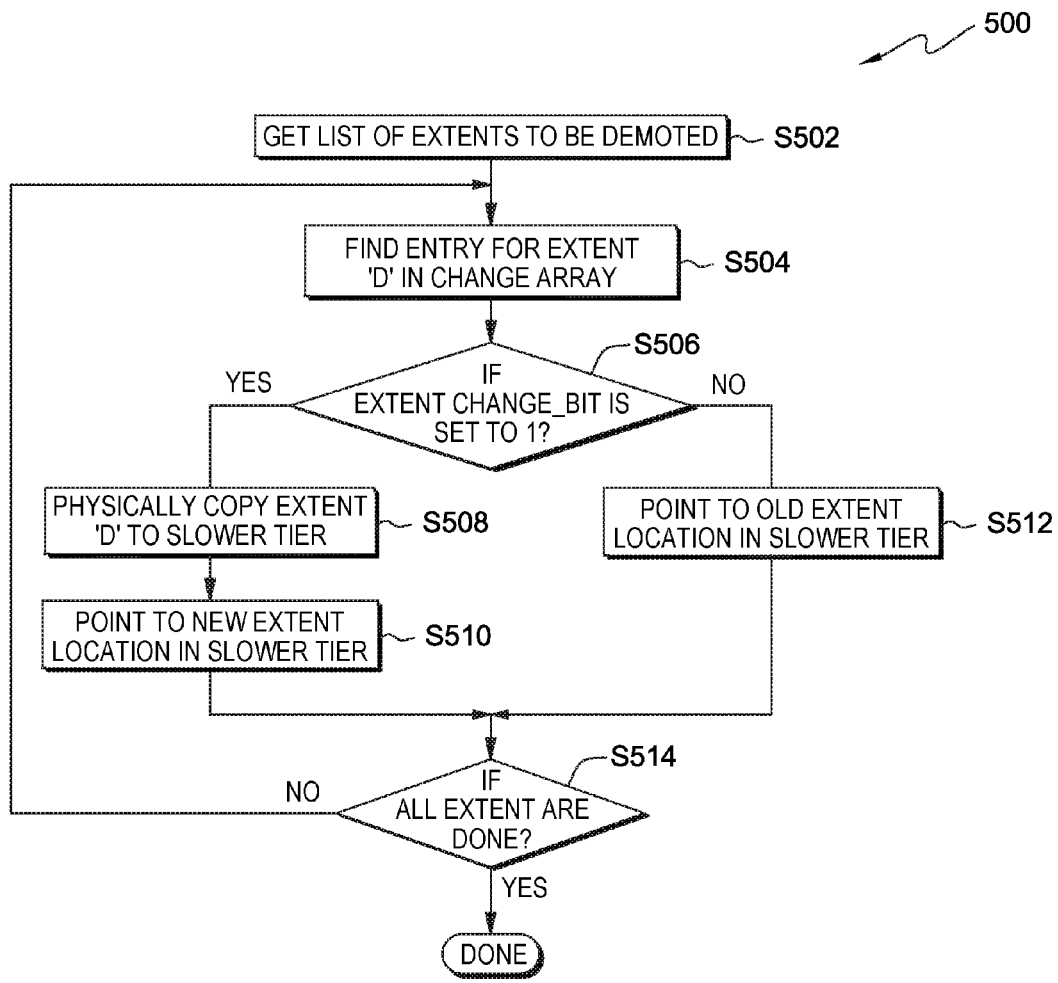
FIG. 5 is a flowchart of a second embodiment of a method according to the present invention.

Flowchart 500 of FIG. 5 includes the following operations (with process flow among and between the operations as shown by arrows in FIG. 5): S502, S504, S506, S508, S510, S512, and S514.

In some embodiments of the present invention, an operation to demote an extent (for example extent-D) includes the following: (i) receive information for extents which are being demoted (operation S502); and (ii) repeat (operation S514) the following operations until all extents in table EXTENT_PROMOTED are processed: (a) if CHANGE_BIT is set to 0 (operation S506, "No" branch), then no copy is required and the pointer to the extent is updated to reference the old location in the slower tier, (b) if CHANGE_BIT is set to 1 (operation S506, "Yes" branch) extent-D is copied from the faster tier to slower the tier (operation S508) and the pointer to extent-D is updated to point to the new extent-D location in the slower tier (operation S510).

Some embodiments of the present invention may include one, or more, of the following features, characteristics and/or advantages: (i) reuses a data extent from a lower tier if the data extent from the lower tier has not been changed or overwritten after the data was promoted to a higher tier; (ii) does not delete a data extent from a slower tier unless there is a WRITE to the corresponding data extent on a higher tier; (iii) retains a copy of a data extent on a slower tier; (iv) demotes a data extent from a higher tier to a lower tier, where the data extent had not been updated since it was promoted to the higher tier, by changing the virtual to physical disk mappings during copy without actually copying the data (which is already, and still on the slower tier); (v) averts a copy operation during movement of data from the higher tier to the lower tier when the data had not been updated since having been promoted to the higher tier from the lower tier; and/or (vi) retains a copy of an extent, untouched, on the lower tier after the data is promoted to a higher tier, and if the data is unchanged on both tiers, and it is to be demoted back to the lower tier, it is demoted without a COPY operation, but merely through an address mapping change.

Some embodiments of the present invention reduce the frequency of data copies across tiers in a multi-tiered storage system. A data block that is promoted (also referred to as "migrated") from a slower tier to a faster tier is not routinely deleted from the slower tier after the promotion. Information corresponding to the data block with respect to its locations on the slower and faster tiers is retained in a data structure (for example, an array). The information includes: (i) a record of the starting logical block address (LBA) and size of the extent on the slower tier; and (ii) the starting LBA of the higher tier to which it has been migrated. This data structure keeps track of all extents that are promoted. The data structure also includes information (such as a bitmap) that is used to record whether extents that have been promoted are overwritten or updated (on either or both of the lower and higher tiers). If an extent is demoted from the higher tier to the lower tier, it is copied to the lower tier if it has been overwritten or changed (on either tier). If the extent has not been changed (on either tier) after promotion, a demotion is accomplished without physically copying the extent. Instead, the copy that is still available, unchanged, on the lower tier, is reused (that is, its location on the lower tier is mapped to the virtual disk).

Change tracking is done for all promoted and demoted extents (on both lower and higher tiers) to ensure that this technique is used only for situations where the data copy has not changed on both locations after movement across tiers. And the technique is used for both promotions and demotions.

Figure 6B:
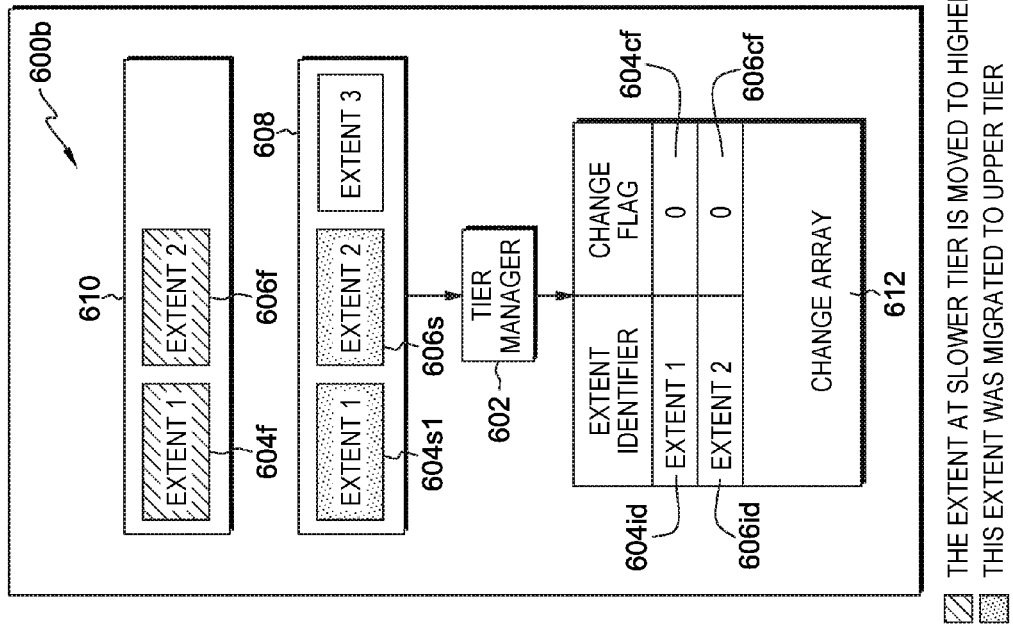
FIG. 6B is a block diagram of a second embodiment of a method according to the present invention.
Figure 6A:
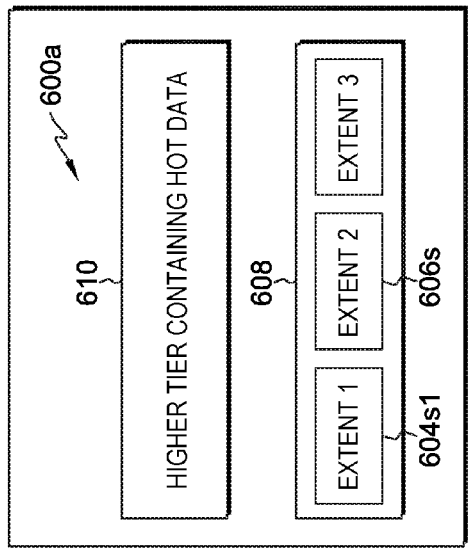
FIG. 6A is a block diagram of a second embodiment of a method according to the present invention.

Block diagrams 600a and 600b of FIGS. 6A and 6B respectively, include: tier manager 602; extent 1 (the term "extent" as used herein is a data set stored in a memory location); extent 2; memory locations 604s1, 604f, 606s, 606f; extent identifiers 604id and 606id; change-flags 604cf and 606cf; slow memory tier 608; and fast memory tier 610. Extent identifiers corresponding to extents 1 and 2 (respectively 604id and 606id); change flags corresponding to extents 1 and 2 (respectively 604cf and 606cf). In some embodiments of the present invention, an extent identifier includes the logical block address and the size of the corresponding extent.

In some embodiments of the present invention, tier manager 602 determines that extents 1 and 2 stored in slow memory tier (at locations 604s1 and 606s respectively) have become "hot" (frequently accessed) and are to be promoted to fast memory tier 610. The tier manager updates change array 612 to include: extent 1 identifier 604id; extent 2 identifier 606id; extent 1 change-flag 604cf; and extent 2 change-flag 606cf. (An entry is added to change array 612 in each promotion operation made by tier manager 602.) Each entry in the change array includes an extent identifier (for example 604id) and a change flag (for example 604cf).

In some embodiments of the present invention, a change-flag is a binary value initialized to 0 upon successful promotion of the corresponding extent. If either or both copies (on the slow and/or fast memory tiers) of an extent is changed, the corresponding change-flag is flipped to a binary value 1. Usage of a change-flag is referenced during subsequent demotion operation, as will be discussed below with reference to FIG. 8 in this Further Comments and/or Embodiments sub-section of this Detailed Description section.

Figure 7:
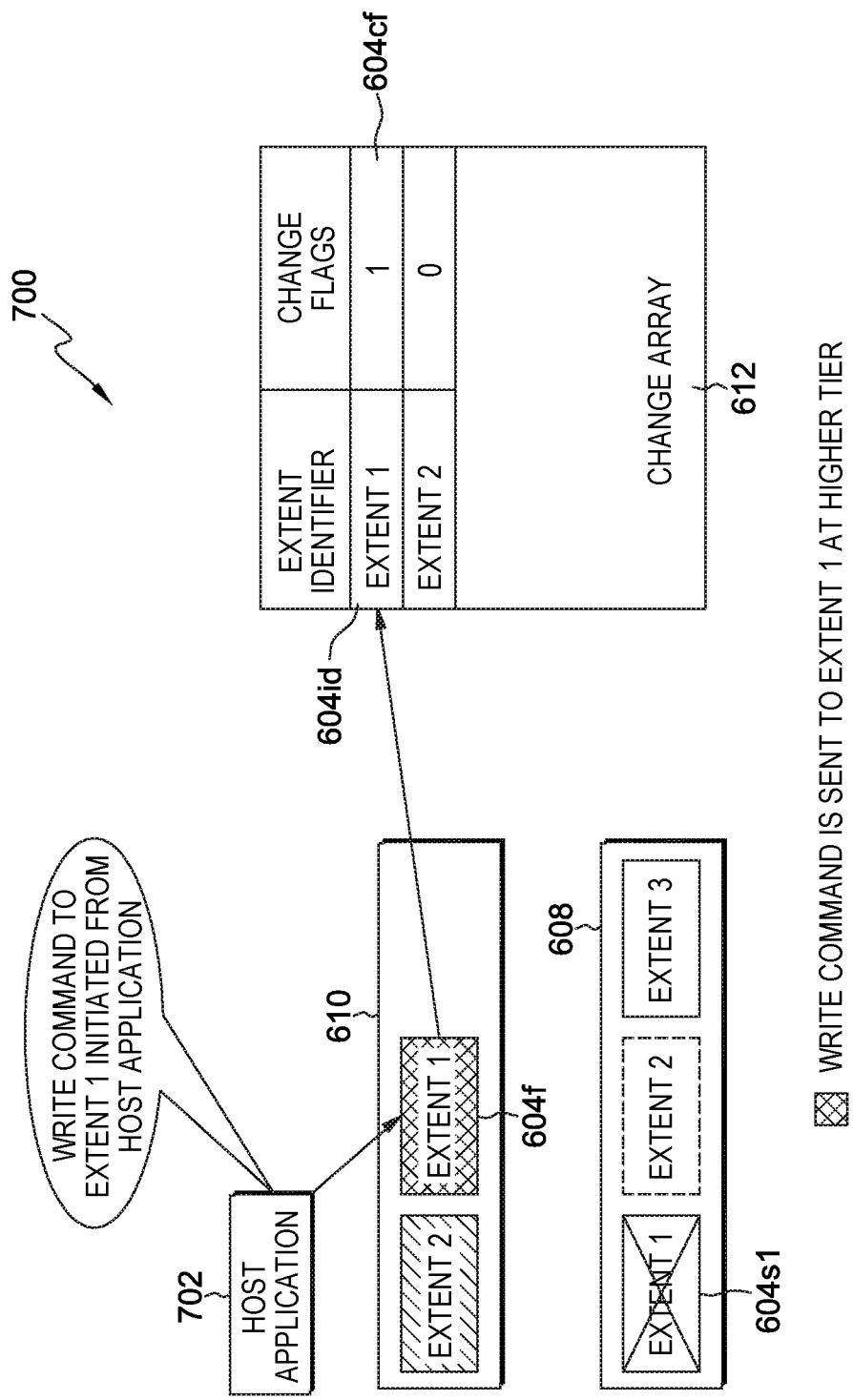
FIG. 7 is a block diagram of a second embodiment of a method according to the present invention.

Block diagram 700 of FIG. 7 includes: memory locations 604s1 and 604f; extent identifier 604id (corresponding to extent 1); change-flag 604cf corresponding to extent 1); slow memory tier 608; fast memory tier 610; change array 612; and host application 702. Block diagram 700 shows some changes that take place, in some embodiments of the present invention, when an extent in a memory tier is updated. For example, assume copies of extent 1 are stored at memory locations 604s1 and 604f. Change-flag 604cf has the binary value 0. A WRITE command directed to extent 1 (in either of the 604s1 or 604f locations) triggers an update to change-flag 604cf. In this example, host application 702 issues a WRITE command, directed at extent 1 in location 604f of the fast memory tier. In response, change-flag 604cf is set to binary value 1, to indicate that extent 1 has been updated (in either tier, or both tiers). Similarly, if an application issues a WRITE command directed to extent 1 is location 604s1 of the slow memory tier, change-flag 604cf would be set to 1. The change-flag is referenced during a subsequent demotion operation as will be discussed below with reference to FIG. 8.

Figure 8:
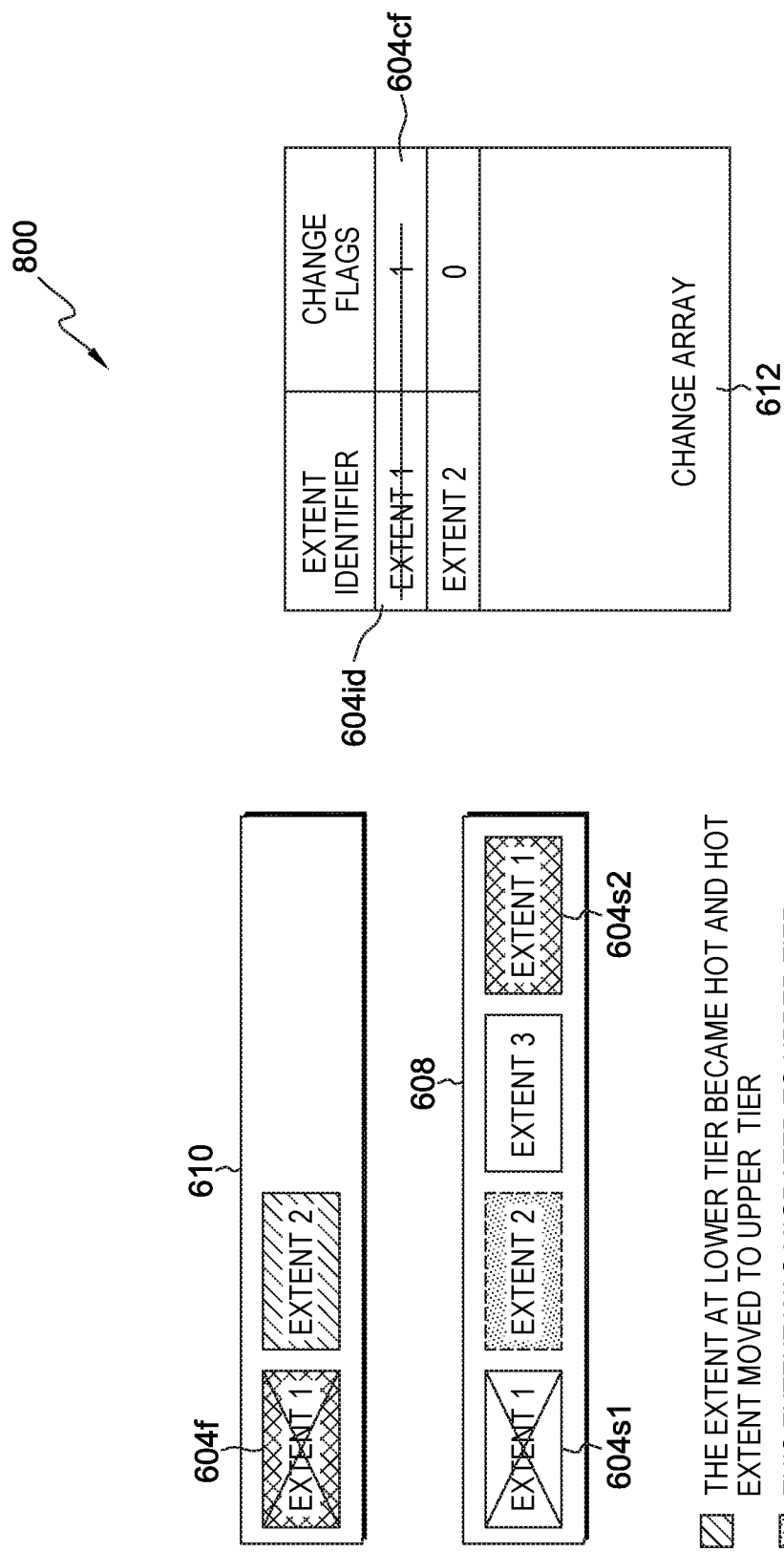
FIG. 8 is a block diagram of a second embodiment of a method according to the present invention.

Block diagram 800 of FIG. 8 includes: extent 1; location 604s1 (original location of extent 1 in the slow memory tier); location 604s2 (a new location for extent 1 in the slow memory tier); location 604f (original location of extent 1 in the fast memory tier); extent identifier 604id; change-flag 604cf (corresponding to extent1); slow memory tier 608; fast memory tier 610; and change array 612.

Block diagram 800 shows some changes in memory that take place in a demotion of extent 1 from location 604f in fast memory tier 610 to location 604s2 in slow memory tier 608, in the event where change-flag 604cf has a binary value of 1 (meaning extent 1 in either or both locations in 604f or 604s1 has been altered at some time after extent 1 was promoted from location 604s1 to location 604f. In this case and under the aforementioned conditions, the method to demote extent 1 includes the following operations: (i) the content of extent 1 at location 604f is copied to location 604s2 in slow memory tier 608; (ii) the record corresponding to extent 1 that includes 604id and 604cf is deleted from change array 612; (iii) the logical block address (LBA) for extent 1 is updated to reference location 604s2 in the slow tier; (iv) the original location of extent 1 in the slow memory tier (604s1) is made available (or, if previously made available, remains available) for data other than extent 1; and (v) location 604f is made available for data other than extent 1.

Alternatively, in some embodiments of the present invention, the demotion of extent 1 as illustrated in block diagram 800, is accomplished in a manner that leaves intact location 604f (meaning location 604f retains the extent 1 dataset, for at least some length of time) such that if extent 1 again becomes hot, it may be re-promoted to 604f merely by updating the LBA. Such a demotion method includes the following operations: (i) the content of extent 1 is copied from location 604f to location 604s2 in slow memory tier 608; (ii) change-flag 604cf in change array 612 is reset to 0; (iii) the LBA for extent 1 is updated to reference location 604s2 in the slow tier; (iv) the original location of extent 1 (604s1) in slow memory tier 608 is made available for data other than extent 1; and (v) the location of extent 1 in the fast memory tier (604f) is made available for data other than extent 1. Should a re-promotion of extent 1 be ordered, and if the binary value of change-flag 604cf is 0, extent 1 can be re-promoted to the fast memory tier merely by updating the LBA of extent 1 to reference location 604f in the fast tier.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Extent (when used in context of data storage), unless otherwise indicated: a contiguous area of storage in a computer file system, represented as a range, identified (or characterized) by a starting logical block address (LBA), and a size parameter.

What is claimed is:

1. A computer-implemented method comprising:
    storing, at a first physical address, an extent;
    mapping a logical block address (LBA) of the extent to the first physical address;
    copying, at a second physical address, the extent;
    mapping the LBA of the extent to the second physical address;
    tracking change histories of the first physical address and the second physical address; and
    on condition that the change histories of the first physical address and the second physical address indicate that data stored at both physical addresses has changed at neither the first physical address nor the second physical address, re-mapping the LBA to the first physical address.

2. The computer-implemented method of claim 1 wherein an extent is a contiguous region of computer memory characterized by a first address and a length.

3. The computer-implemented method of claim 1 where a logical block address (LBA) is a virtual address that is mapped to an address on a physical memory device.

4. The computer-implemented method of claim 1 where the first physical address is within a first cache memory tier.

5. The computer-implemented method of claim 1 where the second physical address is within a second cache memory tier.

6. A computer program product comprising a computer readable storage medium having stored thereon:
    first program instructions programmed to store, at a first physical address, an extent;
    second program instructions programmed to map a logical block address (LBA) of the extent to the first physical address;
    third program instructions programmed to copy, at a second physical address, the extent;
    fourth program instructions programmed to map the LBA of the extent to the second physical address;
    fifth program instructions programmed to track change histories of the first physical address and the second physical address; and
    sixth program instructions programmed, on condition that the change histories of the first physical address and the second physical address indicate that data stored at both physical addresses has changed at neither the first physical address nor the second physical address, to re-map the LBA to the first physical address.

7. The computer program product of claim 6 wherein an extent is a contiguous region of computer memory characterized by a first address and a length.

8. The computer program product of claim 6 where a logical block address (LBA) is a virtual address that is mapped to an address on a physical memory device.

9. The computer program product of claim 6 where the first physical address is within a first cache memory tier.

10. The computer program product of claim 6 where the second physical address is within a second cache memory tier.

11. A computer system comprising:
    a processor(s) set; and
    a computer readable storage medium;
    wherein:
    the processor(s) set is structured, located, connected and/or programmed to run program instructions stored on the computer readable storage medium; and
    the program instructions include:
    first program instructions programmed to store, at a first physical address, an extent;
    second program instructions programmed to map a logical block address (LBA) of the extent to the first physical address;
    third program instructions programmed to copy, at a second physical address, the extent;
    fourth program instructions programmed to map the LBA of the extent to the second physical address;
    fifth program instructions programmed to track change histories of the first physical address and the second physical address; and
    sixth program instructions programmed, on condition that the change histories of the first physical address and the second physical address indicate that data stored at both physical addresses has changed at neither the first physical address nor the second physical address, to re-map the LBA to the first physical address.

12. The computer system of claim 11 wherein an extent is a contiguous region of computer memory characterized by a first address and a length.

13. The computer system of claim 11 where a logical block address (LBA) is a virtual address that is mapped to an address on a physical memory device.

14. The computer system of claim 11 where the first physical address is within a first cache memory tier.

15. The computer system of claim 11 where the second physical address is within a second cache memory tier.

* * * * *